United States Patent
Lippens et al.

(10) Patent No.: US 9,709,819 B2
(45) Date of Patent: Jul. 18, 2017

(54) METHOD FOR PRINTING AN INK JET MARKING ON A SURFACE

(71) Applicant: ESSILOR INTERNATIONAL (COMPAGNIE GENERALE D'OPTIQUE), Charenton le Pont (FR)

(72) Inventors: Xavier Lippens, Charenton le Pont (FR); Daniel Simonin, Cahrenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/432,683

(22) PCT Filed: Oct. 3, 2013

(86) PCT No.: PCT/FR2013/000259
§ 371 (c)(1),
(2) Date: Mar. 31, 2015

(87) PCT Pub. No.: WO2014/053716
PCT Pub. Date: Apr. 10, 2014

(65) Prior Publication Data
US 2015/0277143 A1 Oct. 1, 2015

(30) Foreign Application Priority Data
Oct. 3, 2012 (FR) .................................... 12 59375

(51) Int. Cl.
*G02C 3/00* (2006.01)
*G02C 7/02* (2006.01)
(Continued)

(52) U.S. Cl.
CPC .......... *G02C 7/021* (2013.01); *B41J 2/04581* (2013.01); *B41J 2/2128* (2013.01); *B41J 3/407* (2013.01);
(Continued)

(58) Field of Classification Search
CPC . B41J 3/445; B41J 3/46; B41J 3/04535; B41J 3/0456
(Continued)

(56) References Cited

U.S. PATENT DOCUMENTS 6,120,141 A    9/2000  Tajika et al.
6,293,642 B1 * 9/2001  Sano .................... B41J 2/04581
                                                347/10

(Continued)

FOREIGN PATENT DOCUMENTS

EP    0 726 150 A2    8/1996
EP    1 270 229 A1    1/2003
(Continued)

OTHER PUBLICATIONS

International Search Report, dated Dec. 20, 2013, from corresponding PCT application.

*Primary Examiner* — Stephone B Allen
*Assistant Examiner* — Travis Fissel
(74) *Attorney, Agent, or Firm* — Young & Thompson

(57) ABSTRACT

A method for printing an ink jet marking on a non-wetting surface for liquid ink, includes forming at least a first drop of solidified ink on the surface, by ejecting, by means of a printhead, a first drop of liquid ink at a first given ejection velocity and with a first given volume, and depositing, on at least one portion of said first drop of solidified ink, at least a second drop of ink having a second volume VOL2, by ejecting, by means of a printhead, a second drop of liquid ink at an ejection velocity.

17 Claims, 4 Drawing Sheets

(51) Int. Cl.
  *B41J 2/045* (2006.01)
  *B41J 3/407* (2006.01)
  *B41J 2/21* (2006.01)
  *B41M 3/00* (2006.01)

(52) U.S. Cl.
  CPC ......... *B41M 3/003* (2013.01); *G02C 2202/16* (2013.01)

(58) Field of Classification Search
  USPC ...... 351/178, 159.8, 159.28, 159.69, 159.81; 264/1.2, 1.21, 1.31, 2.7; 347/3, 4
  See application file for complete search history.

(56) References Cited

U.S. PATENT DOCUMENTS

| | | | |
|---|---|---|---|
| 2003/0085934 A1* | 5/2003 | Tucker | B41J 3/407 347/1 |
| 2003/0090685 A1* | 5/2003 | Gardner | B41J 2/2056 358/1.8 |
| 2004/0146055 A1* | 7/2004 | Trauernicht | B41J 2/04573 370/395.62 |
| 2004/0253835 A1* | 12/2004 | Kawase | G02B 6/13 438/780 |
| 2009/0244227 A1* | 10/2009 | Morikoshi | B41J 2/14233 347/93 |
| 2009/0295846 A1 | 12/2009 | Simke | |
| 2011/0101552 A1* | 5/2011 | Cocora | B29D 11/00317 264/2.7 |
| 2011/0102520 A1* | 5/2011 | Kim | B41J 2/14233 347/85 |
| 2012/0104366 A1* | 5/2012 | Cho | H01L 51/0005 257/40 |
| 2012/0272800 A1 | 11/2012 | Lacan et al. | |

FOREIGN PATENT DOCUMENTS

| | | | | |
|---|---|---|---|---|
| EP | 1 392 613 B1 | 8/2005 | | |
| EP | 2 487 039 A2 | 8/2012 | | |
| FR | WO 2010084272 A1 * | 7/2010 | ........... | B41J 2/2114 |
| WO | 2010/084272 A1 | 7/2010 | | |

* cited by examiner

Position of the drops

Result after deposition:
Coalescence of the drops

METHOD FOR PRINTING AN INK JET MARKING ON A SURFACE

BACKGROUND OF THE INVENTION

Field of the Invention

The present invention relates in a general manner to a method for printing a pattern, referred to as marking, which is preferably temporary, via inkjet printing on a surface, in particular a hydrophobic surface and more particularly the surface of an optical article and more specifically of an ophthalmic lens such as a spectacle lens.

The present invention also relates to an optical article, especially a lens and more particularly an ophthalmic lens such as a spectacle lens, on a main surface of which a preferably temporary ink marking is formed.

Description of the Related Art

It is known to print a marking on a surface of a substrate, especially of an optical article and more particularly of an ophthalmic lens, by means of an ink jet.

In the case of ophthalmic lenses such as spectacle lenses, the objective of this printing, of an ink marking on a surface of the lens also referred to as marking out, is to enable the alignment and the control of the alignment of finished ophthalmic lenses, that is to say ophthalmic lenses that have been polished and that have received the added values (scratch-resistant, impact-resistant, anti-reflective, anti-soiling, etc. coatings), for the subsequent treatment steps of the finished ophthalmic lenses, in particular the cutting of the finished ophthalmic lenses in order to shape them to the size and shape of a frame or the piercing of these ophthalmic lenses in order to attach them to a frame.

These finished ophthalmic lenses are generally stored in envelopes, for example paper envelopes, before the final treatments, in particular edging. During the transport of these finished lenses in their envelope, the material of the envelope rubs on the main surfaces of the finished lenses, which results in total or partial destruction of the printed markings. This possibly having the effect of increasing the difficulties of control and of alignment of the finished ophthalmic lenses for the subsequent treatment steps such as cutting or even of rendering these steps impossible, and furthermore possibly having a negative effect on the customer regarding the perception of the quality of the product and service provided.

It is important to note that marking out may also be carried out on semi-finished lenses, that have not been polished on the rear face, with or without added values on the front face, or even on cut ophthalmic lenses, that is to say finished ophthalmic lenses that have been cut in the shape of the frame. The invention is not therefore limited to marking out on finished ophthalmic lenses.

In the case of non-wetting surfaces, for example for hydrophobic surfaces, the drops of ink deposited and solidified generally have a weak adhesion to the surface, which results in a faster destruction of the printed markings during the transport of the lenses.

Moreover, in the case of hydrophobic surfaces, the ease of coalescence of the ink drops degrades the quality of the outline. This coalescence phenomenon has been shown schematically in FIG. 1 and consists of a joining of several ink drops initially deposited side-by-side, due to the surface tension of the ink drops and their mobility on the substrate, in order to form ink spots that are generally separate, of larger dimension and of imprecise shapes. This results in a deformation and a loss of sharpness of the marking. Generally, in order to prevent the problems of coalescence, it may be necessary to deposit the drops with a lower kinetic energy, which generally results in markings that are not as clearly defined.

Thus, the printings of inkjet markings from the prior art on a main surface of a finished ophthalmic lens, especially on a hydrophobic surface, encounter two major difficulties:

a poor definition of the outline of the marking due to the coalescence of the ink drops; and a poor mechanical hold which results in complete or partial deletion of the marking when the finished ophthalmic lens is handled in its packaging.

In order to increase the adhesion of the ink marking to the surface of a substrate, especially hydrophobic surface, it has been proposed to modify the surface adhesion: either by covering the substrate with a temporary tie layer made of an adherent material that aims to increase the adhesion of the ink to the substrate, or by developing specific inks that adhere better to the surfaces, especially hydrophobic surfaces, of the substrates, that is to say that have a lower static contact angle.

The first solution, consisting in depositing a temporary tie layer, necessitates introducing an additional step into the manufacture of the optical article, thus increasing the cost, and necessitating its, generally manual, removal at the end of the operations.

The second solution, use of specific inks, requires significant development fees and substantially increases the manufacturing costs of the optical articles.

These solutions from the prior art are described, inter alia, in application EP 1 392 613.

Other solutions, for example described in application EP 2 487 039, propose selecting an ink that can be polymerized by means of ultraviolet rays and also a drop size and a drop density that prevent any drop superposition and polymerizing each drop, one after the other, immediately after the deposition thereof in order to avoid coalescence of the drops.

SUMMARY OF THE INVENTION

The objective of the present invention is therefore to provide a method for printing an inkjet marking on a surface, in particular a hydrophobic surface, which solves the drawbacks of the prior art.

In particular, the present invention proposes a method for the inkjet printing of a pattern, preferably a temporary pattern, having a good mechanical hold on the surface of the substrate, including a hydrophobic surface, and avoiding the coalescence phenomenon. Moreover, the advantageous results of the invention are obtained without it being necessary to cover the substrate with a temporary additional tie layer made of an adherent material that increases the adhesion, or to develop specific inks. Thus, the method of the invention may be successfully carried out for all the inks conventionally used in the marking of ophthalmic articles, especially ophthalmic lenses, on all the surfaces used, including the most hydrophobic surfaces.

Another subject of the invention is an optical article, especially a finished ophthalmic lens comprising a, preferably temporary, ink marking, which adheres sufficiently to the substrate so as not to be deteriorated by the transport thereof in a packaging and the outline of which is not impaired by coalescence of the ink drops of the marking.

The objective of the invention is therefore to increase the hold and the quality of the mark without chemical modification of the interface.

In order to do this, use is made of at least two ink printing passes, the first pass deposits a first layer of ink and comprises the ejection of drops of ink at a sufficient velocity to flatten them on the surface to be printed thus increasing the adhesion of the ink to the surface to be printed.

The first layer of ink, having been deposited with a high kinetic energy, has an increased adhesion to the surface of the ophthalmic lens which persists after solidification of the ink. This increase enables the marking to better withstand abrasion.

Due to the relatively high ejection velocity of the drops of ink of the first layer, it is preferable for the drops of ink of the first layer to be of small size in order to prevent risks of rebound or bursting of the drops, especially when the mark is made on a curved surface such as the surface of a finished ophthalmic lens.

Moreover, due to their small size, the drops of ink of the first layer have no or little lateral contact with one another, thus limiting the risk of coalescence of the drops of this first layer.

It is then preferable that, for at least one portion of the marking, the entire first layer is made with small drops of ink. Any drop of ink that is too large would risk bursting, degrading the good definition of the marking.

This first layer of ink is not generally sufficiently visible, and therefore a second pass is carried out.

In other words, in order to produce one dot of the marking, a first drop of ink is firstly deposited, with a sufficient velocity to flatten it on the non-wetting surface and a second drop of ink is then deposited.

It is advantageous for the second drops of ink to have at least one visible color, that is to say that they are absorbent in the visible spectrum, either naturally, or by fluorescence during a stimulation, for example by ultraviolet radiation.

In one particular case, the first and second drops of ink have the same color.

During the second pass, the drops of the first layer are solid. That is to say that they are in their final state before the drops of ink of the second layer are deposited on the drops of ink of the first layer. Their final state may be obtained by polymerization, drying, evaporation of a solvent, cooling, curing, etc. depending on the type of ink used. This may be carried out by means of a curing/polymerization step after the first ink printing pass. Alternatively, it may be carried out during the first pass, either drop by drop, or more generally using a curing/polymerization head behind the printhead, for example by means of a lamp that emits ultraviolet radiation.

The second pass comprises the ejection of drops of ink, generally of larger size than the drops of ink of the first layer, at an ejection velocity that is generally lower than that of the drops of ink of the first layer; in practice, the ejection velocity customarily used for the marking out on the surface of ophthalmic lenses of the same curvature for which there are not considered to be adhesion problems with this same ink. However, the ejection velocity of the second drops of ink during the second pass may be equal to that of the first drops of ink deposited during the first pass. In certain cases, the second pass comprises a deposition of two successive layers of ink deposited with one and the same ejection velocity and generally a same drop size.

The drops of ink of the second layer are each deposited at least partly on the drops of ink of the first layer thus ensuring the wettability of the drops of ink of the second layer, on their deposition surface, here the small flattened and cured drops of the first layer. Preferably, each drop of ink of the second layer covers at least one drop of ink of the first layer.

Thus, due to the fact that drops of ink are deposited on a sublayer of known cured ink, formed by the solidified drops of ink of the first layer, the adhesion and the behavior of the drops of the second layer become independent of the surface treatments and of the materials of the surface of the ophthalmic lens. Indeed, adhesion to the ink of the layer of ink deposited in the first pass (preferably of the same material) is known.

It is thus easy to deposit large drops of ink, at velocities that make it possible to give the marking sufficient contrast and visibility, without a risk of uncontrolled behavior of the drops during the second pass.

The size and the ejection velocity of the drops of ink of the second layer depend on the desired visual rendering.

A partial coalescence of the drops of the second layer may occur, or be desired, without disturbing the outline of the marking which is stabilized by the ink deposited during the first pass.

The second pass enables the marking to be made more visible and enables greater resilience to abrasion. Indeed, the material of the ink may be friable once cured. During the transport of an ophthalmic lens, the ink is subjected to abrasion. When the material is friable, a given amount of material is abraded in the thickness of the marking produced. By depositing a second layer, it is thus possible to still have a sufficient thickness of material to enable good visibility of the marking even after abrasion of a small amount of material. If the sublayer according to the invention is not deposited on a hydrophobic substrate, the abrasion due to transport may move a portion of the marking over its entire thickness instead of being limited to abrading a thin surface thickness.

One important feature of the present invention is the initial non-wettability of the surface of the substrate by the inks used, in particular the ink used during the first pass in order to form the first layer.

Within the context of the present invention, it is considered that the ink is "slightly wettable" if the static contact angle of the liquid ink with the surface of the substrate is greater than 80°, and non-wettable when it is greater than or equal to 90°, better still greater than or equal to 95° and at the very least when it is greater than or equal to 100°.

The invention applies very particularly to depositing layers of ink on a surface on which the liquid ink is non-wettable, but it could also apply to cases where the ink is slightly wettable so as to increase the mechanical hold of the layer of ink on this surface.

Thus, according to one embodiment of the invention, in order to improve the adhesion of an ink, in particular of a drop of ink, on a surface to which this ink does not adhere, consists therefore in creating on the surface a thin sublayer by means of a drop of ink that is itself non-adherent deposited under conditions such that this thin sublayer adheres to the surface and forms a tie layer for a second layer, for example a second drop of ink, so that the surface, covered by the solidified first drop becomes "wettable" by the ink of the second layer.

In general, the drops of ink are treated between the two passes, preferably for the drops of the first layer immediately after the deposition on the surface, so that the "flattened" drops are solidified, in particular polymerized, before they can return to equilibrium, that is to say go back to a partial sphere shape characteristic of a liquid on a non-wettable surface.

One important aspect of the invention is the flattening, in particular without bursting, of the drops of ink of the first layer which conditions the hold of the first layer on the surface of the substrate.

BRIEF DESCRIPTION OF THE DRAWING FIGURES

The remainder of the description refers to the appended figures.

DETAILED DESCRIPTION OF THE INVENTION

More particularly the present invention relates, according to a first embodiment of the invention, to a method for printing an inkjet marking on a surface that cannot be wetted by the ink in liquid form, which comprises the following steps:

(a) forming at least a first drop of solidified ink on the surface, by ejecting, by means of a printhead, a first drop of liquid ink at a first given ejection velocity and with a first given volume, and (b) depositing, on at least one portion of said first drop of ink, at least a second drop of ink having a second volume, by ejecting, by means of a printhead, a second drop of liquid ink at an ejection velocity.

In this embodiment, the first velocity is sufficient to flatten the first drop of ink and give said first drop of ink a flattening contact area equivalent to that obtained at equilibrium for a drop of liquid ink of the same volume on a wettable surface.

A wettable surface is understood to mean a surface on which the drop of liquid ink forms a static contact angle of less than or equal to 80°, preferably less than or equal to 60°.

Furthermore, the flattening contact area corresponds to a contact area between the first drop of ink and the non-wetting surface during the deposition of the second drop of ink.

Figure 1:
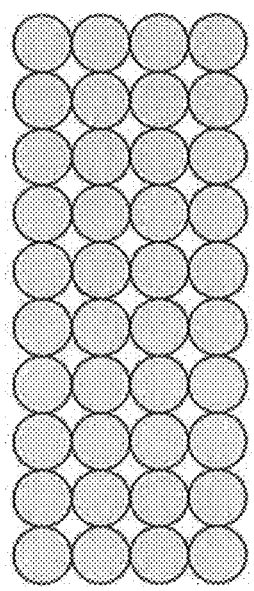
FIG. 1 is a schematic representation of the coalescence phenomenon.
Figure 1:
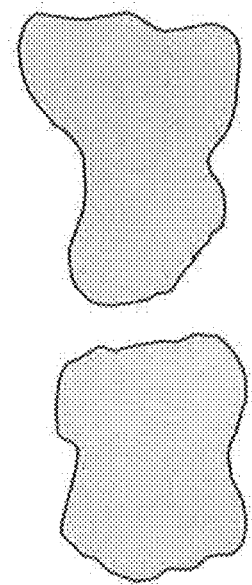
Figure 2:
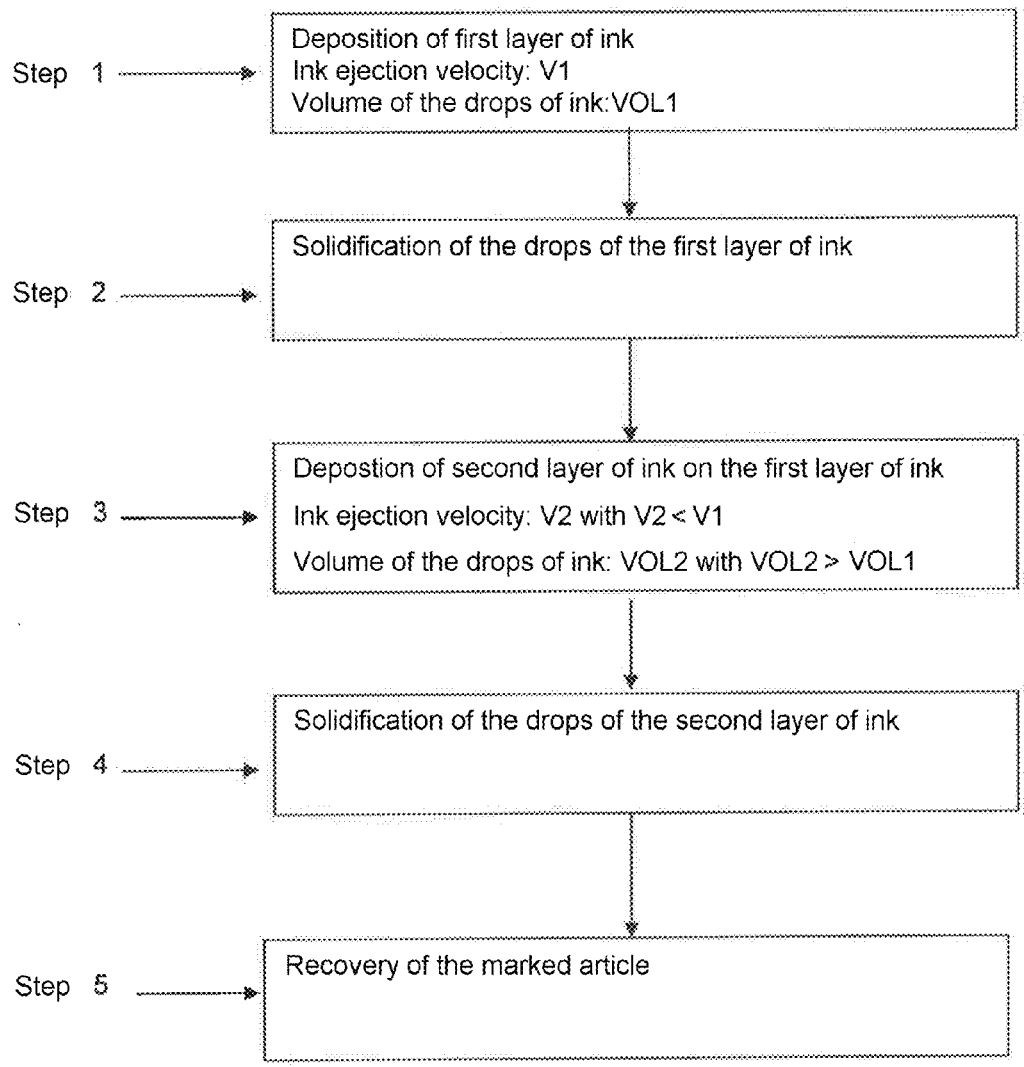
FIG. 2 is a flowchart of the steps of one embodiment of the method of the invention.

In general, the method of the invention comprises, during or after each step of depositing a drop of liquid ink, a step of solidifying the drop of ink deposited (steps 2 and 4, FIG. 2).

Thus, if the first drop of liquid ink ejected onto the surface is solidified before the deposition of the second drop of ink, the flattening contact area is defined as the contact area of the first drop of ink on the surface, once solidified.

These solidification steps 2 and 4 may be carried out during the deposition steps 1 and 3 or at the end of these deposition steps.

Depending on the nature of the ink used, the solidification may be obtained by polymerization, drying, evaporation of solvent, cooling or curing. The drying and the evaporation of solvent may be carried out at room temperature or at a higher temperature. The polymerization and the curing may be a thermal polymerization or curing, or a polymerization or curing obtained by irradiation with actinic radiation, for example irradiation with ultraviolet light.

Such solidification steps, in particular drying, polymerization or curing steps, are well known to a person skilled in the art.

In the end, a marked article is recovered (step 5, FIG. 2), the marking of which is clearly defined and has good mechanical hold.

The first ejection velocity of the drop of ink, sufficient to flatten the first drop of ink and give it a flattening contact area equivalent to that obtained at equilibrium on a wettable surface, may be defined in the following manner: it is advantageously an ejection velocity such that if several drops of ink having a volume of 6 pl are deposited with said ejection velocity on the non-wettable surface, the mean diameter of the solidified drops deposited, as seen from above, is greater than 39 µm, preferably greater than or equal to 40 µm and better greater than or equal to 42 µm.

The observation of the drop diameters may be carried out with a calibrated microscope.

According to one aspect of this embodiment, the surface is a surface of non-zero curvature.

Thus, the marking may be printed on the surface of an optical article, preferably an ophthalmic lens.

According to another aspect of this embodiment, the first volume of the first drop of ink is less than the critical volume for which the first drop of ink bursts or rebounds when it is deposited at the first velocity on the non-wettable surface.

A surface that cannot be wetted by the ink in liquid form is understood preferably to mean a surface such that the drop of liquid ink has a static contact angle with the surface of greater than or equal to 90°, preferably greater than or equal to 100°.

According to one aspect of this embodiment, although it is possible to use different inks for the first drop of ink and the second drop of ink, preferably the same ink will be used for the first and second drops of ink, in particular an ink having an identical color. In all cases, at least the ink of the second drop has a color in the visible spectrum.

According to one aspect of this embodiment, the first drop of ink and the second drop of ink respectively have a first volume VOL1 and a second volume VOL2 such that VOL1/VOL2<1, or even VOL1/VOL2≤0.5, or else VOL1/VOL2≤0.2.

The first volume is for example within the range [5 pl to 15 pl].

The second volume is for example within the range [20 pl to 50 pl].

The non-wetting surface may in particular be a hydrophobic surface having a static contact angle with water of greater than or equal to 80°, better greater than or equal to 90°, better still greater than or equal to 100°, and preferably greater than or equal to 110°.

A second embodiment of the invention is a method for printing a marking, for example a temporary marking, via inkjet printing on a surface that cannot be wetted by said ink in liquid form. This method for printing a marking comprises a repetition of the steps of the first method according to the first embodiment. Thus, the formation of several first drops of ink solidified on the non-wettable surface and the deposition of several second drops of ink on top of said first drops are carried out.

Thus, by repeating the steps of the method according to the first embodiment, it is possible to form a marking comprising a repetition of tie points produced by the solidified first drops of ink, flattened on the non-wettable surface so as to confer sufficient adhesion, and on top, a repetition of the second drops of ink which make it possible to give sufficient visibility to the marking.

According to one aspect of the second embodiment, several of the solidified first drops of ink are formed on the surface in a first inkjet printing pass and several of the second drops of ink deposited on top of said first drops of ink are deposited in a second inkjet printing pass, after the first pass.

Alternatively, some of the second drops of ink are deposited on the solidified first drops of ink when all of the first drops of ink that make it possible to form the marking are not yet formed on the surface.

According to one aspect of the invention, during the first pass, only first drops are deposited. According to another aspect of the invention, a minority of drops deposited during the first pass are not first drops as defined above. Said minority is defined as representing less than a third of the drops, preferably less than a quarter, or even less than a fifth of the drops deposited during the first pass. Preferably, substantially all the solidified ink drops formed during the first pass are first drops of ink as defined above.

The invention also applies to an article comprising a main surface on which at least one inkjet marking is printed on a surface that cannot be wetted by the ink in liquid form. In particular, said marking comprises a first drop of solidified ink having a first volume and a flattening contact area with the surface of the lens equivalent to that obtained at equilibrium for a drop of liquid ink of the same volume on a wettable surface. A wettable surface is understood to mean a surface on which the drop of liquid ink has a contact angle of less than or equal to 80°, preferably less than or equal to 60°.

The marking furthermore comprises a second drop of ink having a second volume, covering, at least partly, said first drop of ink.

According to one aspect of the invention, the above article may comprise several dried first drops forming a first layer and having several second drops, forming at least a second layer.

A first aspect of the second embodiment of the method of the invention has been represented in FIG. 2 in the form of a flowchart.

Step 1 consists of the inkjet deposition, on a surface of an article, of a first layer of ink E1 at a velocity V1 and a drop volume VOL1. This first layer of ink is then solidified in step 2 and forms a base marking on which, in step 3, a second layer of ink is formed by inkjet deposition of an ink E2 at a velocity V2 lower than V1 and a drop volume VOL2 greater than VOL1. The second layer of ink obtained in step 3 is then solidified during a step 4 before the recovery, in step 5, of an article having, on its surface, a printed marking that is clearly defined and has good mechanical hold.

Generally, the first ejection velocity V1 of the first drops of ink E1 is chosen to be high enough to allow a flattening of the first drops of ink E1, and thus an increase in the contact area of the first drops of ink E1 with the printing surface, in particular a hydrophobic printing surface.

Independently of this embodiment, the inventors have identified a method for determining the minimum adequate ejection velocity V1. According to the invention, generally, the minimum ejection velocity V1 of the first drops of ink E1 is such that for a given ink E1 and a substrate surface made of a given material, in particular hydrophobic material, this velocity results, for a first drop of ink E1 having a volume VOL1 of 6 pl, in a mean diameter of the drops deposited on the surface of the substrate of greater than 39 μm, preferably greater than or equal to 40 μm and better greater than or equal to 42 μm. In general, the mean diameter of the drops of ink E1 of the first layer will be from 41 μm to 45 μm, for example 43 μm.

Thus, a suitable means for determining the first ejection velocity of the ink in order to make the first drops of ink stick to a surface, in particular a hydrophobic surface, may consist in:
  depositing on the surface drops of 6 pl at various increasing ink ejection velocities;
  measuring the mean diameters of the drops deposited; and
  retaining the ejection velocity that makes it possible to obtain drops of ink having a mean diameter at least equal to 40 μm.

The mean radius of the drops may be measured by means of an optical microscope with a 10× or 20× magnifying lens with a calibrated measuring table, according to its instructions, to carry out precise movements of less than a micrometer and comprising an apparatus for controlling the movement. Such an apparatus may be a Nikon Trinocular MM40 measuring microscope distributed by Nikon Corp.

In particular, it is possible to deposit several neighbouring drops of 6 pl with a density of 360 dpi (dots per inch (2.54 cm)), i.e. approximately a pitch of 70.5 μm. Next, by using the measuring microscope, the diameters of 10 to 15 drops are measured and averaged. If the drops are coalesced, it is preferable to redo the measurements with a larger pitch.

A simple relationship may be calculated between the diameter of a drop of liquid, equivalent to a sphere portion, and the contact angle between this drop and the surface on which it is deposited. The document "Contact Angle and Wetting Properties" by Yuehua Yuan and T. Randall Lee, *Surface Science Techniques*, Springer Series in Surface Sciences 51, DOI 10.1007/978-3-642-34243-1_1 in section 1.5.1: The wetting angle at equilibrium, theta, for a very small drop, may be equivalent to 2*A tan(h/c), with h a height at the center of the drop and c the radius of a circle describing the contact area between the sphere portion representing the drop and the surface on which the drop is placed.

A person skilled in the art knows, by means of these calculations, and simple geometric calculations for the volume of a partial sphere, that a drop of ink of 6 pl, having a static contact angle of 100° with the surface, has an apparent diameter of 26.3 μm approximately for an actual contact area having a diameter of 25.8 μm approximately. And for a static contact angle of 110°, like for the ink/surface pairings studied in the invention: a diameter of 25 μm for an actual contact diameter of 23 μm.

Similarly, obtaining a drop having a diameter of 40 μm or more amounts, apart from the flattening mechanism, to having either an absorbant surface, or a static contact angle between the drop and the surface of less than 49.5° when the apparent diameter is greater than 39.6 μm, and an angle of less than 45° (Pi/4) for an apparent diameter of greater than 41 μm.

Thus, in view of the examples above, the ejection velocity of the first drops is such that the first drops, having a static contact angle of greater than 100° with the surface, are deformed so as to cover an area equivalent to that which they would cover if they were present on a surface having a high wettability, with a static contact angle of less than 50°, preferably 45°.

A person skilled in the art therefore understands that the invention relates to the fact of adding sufficient kinetic energy to at least a first drop so that, on the one hand, the drop is flattened on the surface so as to have, during the solidification thereof, a contact area close to a contact area, at equilibrium, on a wettable surface, for example with a static contact angle of less than 80°, preferably less than 70°, better less than 60°, better still less than 45°, and so that, on the other hand, the drop is small enough so that it does not burst or split up during the impact between the first drop and the non-wettable surface. These bursting cases may at least take place for drops of from 35 to 50 pl ejected under a voltage of 15 V when they are deposited directly on the hydrophobic, non-wettable surface with a static contact angle with water of greater than 110°.

The first highly flattened drops do not have a partial sphere or spherical dome shape like a drop at equilibrium with a static contact angle of from 45° to 60°, but a shape that resembles rather a truncated version of the biconcave disc shape characteristic of "red blood cells".

However, the method of determining the first velocity V1 is not critical in order to be able to apply the principle of the invention.

An alternative method of determining the first velocity V1 that is less precise but as industrially effective as the method presented above, may be to deposit, on several substrates having a main surface that has identical characteristics of non-wettability with the liquid ink, first layers with drops that have an identical first volume of between 5 pl and 15 pl, for example 6 pl. Furthermore, the first layers are deposited at different velocities depending on the substrates so that for at least one clearly identified substrate, the first layer is deposited at a first velocity V1 different from the first velocity V1 used for depositing the first layer of at least one other substrate. Preferably, several first velocities V1 are thus used.

Next, on each of the substrates, the second pass is carried out during which one or more layers may be deposited with drops ejected at a second velocity V2, here lower than the first velocity V1, and with a second drop volume larger than the first volume, for example a second substantially constant volume of between 20 pl and 60 pl; the second velocities V2 and the second volume here being identical for all the substrates tested.

The adhesion performances may then be evaluated by introducing the marked lenses into standard pouches, depositing the pouches in a container, shaking the container or carrying out a transport simulation as described below.

It then becomes easy for a person skilled in the art to visually compare the lenses in order to identify that or those having the least degraded markings and to thus determine a minimum first ejection velocity V1 in order to have a marking that has sufficient adhesion.

It is furthermore known that when piezoelectric ink ejection devices are used, it is possible, for each printhead, to correlate the ejection velocity to the voltage applied to the device. In this case, it is possible to apply the invention without directly controlling the ejection velocity as such and only varying the voltages applied.

The inventors have determined in particular that for an XAAR inkjet printhead (such as the XAAR 1001 GS6 printhead) such as that used in the Teco X302 machine distributed by TECOPTIQUE between 2010 and at least 2012, that first velocities V1 suitable for ejecting the ink E1 of the first layer are obtained for applied voltages of 10 volts or more, preferably 12 volts or more, better 14 volts or more and better still 15 volts or more. In general, the appropriate voltages are from 7 to 18 volts depending on the inks and the inkjet printing machines. However, as a function of the machine, the ink and the wettability of the ink with the surface, the appropriate voltage may be higher or lower.

Thus, the minimum first velocity V1 used according to the invention, for a drop of ink such as those used from the example, may be defined as being the velocity of a 6 pl drop of ink from an XAAR 1001 GS6 printhead having an applied voltage of 10 V, knowing that for this printhead, an applied voltage of 18 V corresponds to an ejection velocity of around 6 m/s.

A person skilled in the art will understand that the less wettable the ink on the surface, the higher the minimum first velocity V1.

According to one embodiment of the invention, as indicated above, the ejection velocity V2 of the ink E2 in order to form the second layer of ink of the printed marking may be lower than the first velocity V1 for ejecting the ink E1 of the first layer.

In the case where a piezoelectric printing device is used, the voltages to be used for the second pass will be chosen as a function of a desired visibility for the second layer and may be less than, greater than or equal to those used for depositing the first layer, for example less than or equal to 15 volts, or to 12 volts, or to 10 volts, or even 5 volts or less, for example 2 volts.

As already mentioned above, use is preferably made, in order to form the first layer of ink E1 on the surface to be marked, of ink drops of small size, that is to say generally having a volume VOL1 of less than or equal to 18 pl, and generally ranging from 5 pl to 15 pl, for example 6 pl. Thus, any risk of coalescence of the drops of ink E1 of the first layer is avoided and above all the drops deposited at the velocity V1 are prevented from rebounding or bursting on coming into contact with the non-wettable surface. A person skilled in the art will know how to adapt the volume of the drops of the first layer as a function of the dot density (dots per inch: dpi) desired for the marking to be printed.

The volume VOL2 of the drops of ink E2 of the second layer is greater than that of the drops of ink E1 of the first layer and is in general from 20 pl to 60 pl, for example 42 pl approximately.

Preferably, the VOL1/VOL2 ratio of the drops of ink E1 and E2 satisfies the relationship VOL1/VOL2<1, better VOL1/VOL2≤0.5 and better still VOL1/VOL2≤0.2.

Preferably, the number of drops of ink E1 of the first layer and the number of drops of ink E2 of the second layer of the printed marking is the same. But, as a variant, it is possible to provide a greater number of drops for the first layer relative to the second layer. Moreover, the drops of ink of the first layer and those of the second layer may be distributed differently. Thus, for example, it is possible to provide a greater drop density of the first and/or of the second layer near the desired limits of the marking and a lower drop density at the center of the marking.

Although it is possible to use different inks E1 and E2, use will preferably be made of the same ink, in particular having an identical color, for the first and second layers. In all cases, at least the ink of the second drops has a color in the visible spectrum.

Although, for economic reasons, it is sufficient to deposit only two layers in order to form the ink marking, it is possible to deposit additional layers. These additional layers are preferably deposited under the same conditions as the second layer of ink E2.

This is in particular the case during marking out on surfaces of high curvature such as are found on finished or semi-finished ophthalmic lenses having a base curve of 5 or more. Such lenses have a large height variation between the center and the edge. Such a height variation may result in having a loss of sharpness at the edges if a normal deposition velocity is used, even for surfaces that are not particularly hydrophobic. It is therefore preferable, in this case, to deposit two successive layers with a reduced ejection velocity, for example with a voltage of 2 volts instead of depositing a layer with a normal ejection velocity, for example with a voltage of 5 volts.

If the curvature of the lens is such that the standard method for this curvature recommends using two passes for a non-hydrophobic surface, the method according to the invention will preferably comprise a first pass at the ejection velocity V1 with drops of volume VOL1 then two passes at ejection velocity V2 with drops of volume VOL2.

The method for printing an inkjet marking according to the invention may be used for printing an inkjet marking on any type of surface, but proves particularly suitable for printing an inkjet marking on hydrophobic surfaces, and more particularly ultra-hydrophobic surfaces of optical articles such as ophthalmic lenses for instance spectacle lenses.

A hydrophobic surface in the present invention is understood to mean a surface having a static contact angle with water of greater than or equal to 90°, better greater than or equal to 100° and preferably greater than or equal to 110°.

Generally, the invention applies to the deposition of inks that have insufficient wetting with the surface to be marked. For example, the ink may be an ink for hydrophilic surfaces that it is desired to deposit on a hydrophobic surface; or, conversely, the ink may be an ink for hydrophobic surfaces that it is desired to deposit on a hydrophilic surface.

Examples of hydrophobic surfaces, conventionally used in ophthalmic optics, are the anti-soiling layers used as an outer coating for ophthalmic lenses and spectacle lenses.

Among the standard anti-soiling layers, mention may be made of the layers formed from the commercial products OPTOOL-DSX® (fluoroelastomer) and KY 130® sold respectively by DAIKIN INDUSTRIES LTD and SHIN ETSU CHEMICAL CO. LTD. These coatings have static angles with water equal to 112.5° or 115.5° for two variants of the DSX® product and of around 111° for KY 130®.

The inks that can be used in the method may be any inks conventionally used for the printing of inkjet markings, in particular for marking ophthalmic lenses.

Among the commercial inks that can be used in the method of the invention, mention may be made of the inks T002 LED® and T002-06 LED® sold by TECOPTIQUE, or of other inks such as the ink Y-001®, Y-002® or Y-003® distributed by Automation & Robotics®.

Preferably, after each deposition step, the layer of ink formed is solidified, for example by polymerization via UV irradiation, depending on the nature of the ink used.

Example

The inkjet marking of the surface of various lenses having a hydrophobic surface was carried out using the method of the invention and a standard inkjet marking method.
Characteristic of the Lenses

| | Optical power (diopters) | Substrate | AR coating | Hydrophobic coating |
|---|---|---|---|---|
| Lens no. 1 | flat | CR39 ® | standard | OPTOOL DSX ® |
| Lens no. 2 | +6 | CR39 ® | standard | KY 130 ® |
| Lens no. 3 | +6 | CR39 ® | standard | OPTOOL DSX ® |

Since the type of antireflective coating used has no impact on the surface properties, it is not specified in further detail.
Inks Used
T002 LED®
T002-06 LED®
Contact Angles of the Inks with the Surface of the Lenses

| | Contact angle | |
|---|---|---|
| Lens no. | Ink T002 LED | Ink T002-06 LED |
| 1 | 111° | 112° |
| 2 | 117° | 121° |
| 3 | 113° | 115° |

Figure 3:
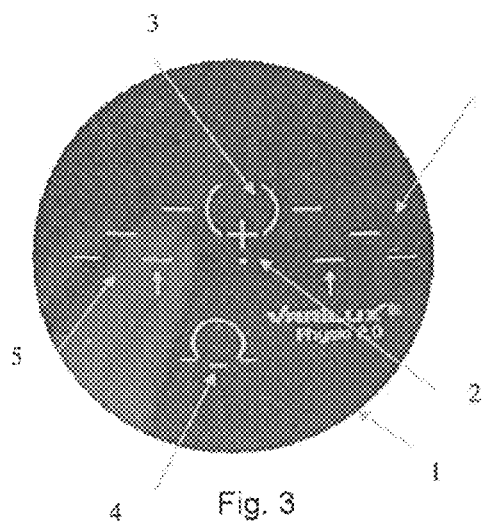
FIG. 3 is a photo obtained after deposition of the first pass according to the invention on an uncut finished ophthalmic lens 1.

The measurement of the contact angles may be carried out for example with a DSA100 measuring machine distributed by KROUS. Depending on the way in which the wetting angle may be measured, it may be necessary to carry out a calculation in order to get back to the angle between the air-drop interface and the substrate-drop interface.
A—Printing According to the Invention
Teco X302 inkjet printing device distributed by TECOPTIQUE.
Printing Parameters
  First Pass
  Drop volume [6 pl, i.e. setting 1 of the Teco X302 device]
  Voltage applied [15 V]
  Number of drops deposited: uniform density of 360 dpi.
  UV polymerization following deposition of the complete first layer of ink.
  Second Pass
  The marking deposited is overall superimposed on the marking of the first pass, it being possible for the drops of the second pass to go over the edges of the drops of the first pass that they cover. The marking is furthermore deposited as two successive layers with the same printing parameters with a UV polymerization step following the deposition of each of the two layers of the second pass.
  Drop volume [42 pl, i.e. setting 7 of the Teco X302 device]
  Voltage applied [2 V]
  Number of drops deposited: uniform density of 360 dpi.
B—Printing According to a Conventional Method
The marking is deposited as two successive layers with the same printing parameters with a UV polymerization step following the deposition of each of the two layers.
  Drop volume [42 pl, i.e. setting 7 of the Teco X302 device]
  Voltage applied [2 V]
  Number of drops deposited: uniform density of 360 dpi.
  UV polymerization following creation of the complete second layer of ink.
C—Results
FIG. 3 is a photo obtained after deposition of the first pass according to method A according to the invention on an uncut finished ophthalmic lens 1 provided for a right lens.

This ophthalmic lens 1 has here temporary marks 2 to 5, namely a reference point 2 located at the center of this ophthalmic lens 1, a mark 3 indicating a far vision zone control point located just above the reference point 2, a mark 4 indicating a near vision zone control point located below the reference point 2 and two groups 5 and 6 of alignment lines that pass through a horizontal nasal-temporal (or else nose-ear) axis making it possible to locate the microcircles.

The microcircles, which have not been rendered visible in this photograph, are permanent marks that make it possible in particular to correctly position the ophthalmic lens 1 for subsequent manufacturing steps of this ophthalmic lens; for example the surfacing, polishing and/or trimming of the latter.

It can be seen that the outline of the temporary marks 2 to 6 is clearly defined but with a low contrast.

Figure 4:
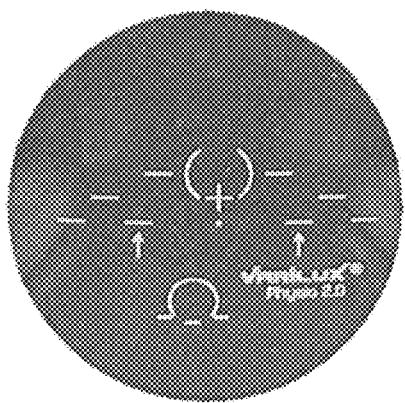
FIG. 4 is a photo obtained after deposition of the second pass according to the invention on an uncut finished ophthalmic lens according to the method according to the invention.

FIG. 4 is a photo obtained after deposition of the second pass according to method A according to the invention on an uncut finished ophthalmic lens provided for a right lens.

It can be seen that the outline is as clearly defined as in FIG. 3, but has a higher contrast.

It should be noted that, on leaving the printing machine, an uncut finished ophthalmic lens marked by means of the method B will at first sight resemble the lens from FIG. 4.

Figure 5:
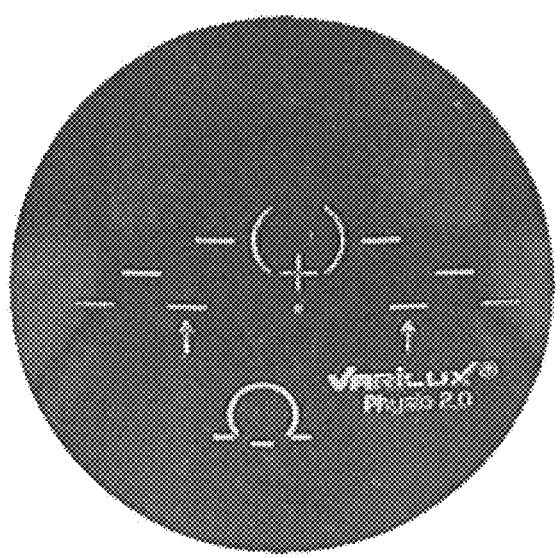
FIG. 5 is a photo obtained after the ophthalmic lens marked by means of the method according to the invention has been subjected to a simulation of transport from the production site to the optician's.

FIG. 5 is a photo obtained after the ophthalmic lens marked by means of the method according to the invention has been subjected to a simulation of transport from the production site to the optician's.

In practice, the simulation of transport is obtained by placing the uncut finished ophthalmic lens in a standard envelope used for this type of consignment by the ophthalmic industries, then by placing this lens with others in a cardboard box which is sent in a truck from Paris (France) to Dijon (France) then sent back to Paris.

Figure 6:
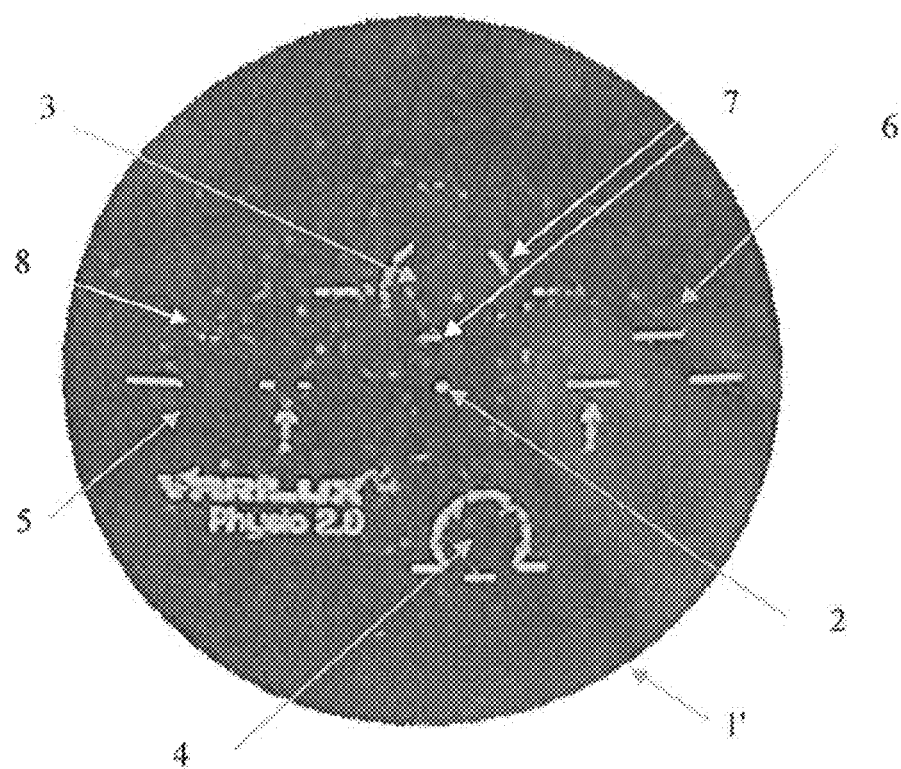
FIG. 6 is a photo obtained after the ophthalmic lens marked without using the method according to the invention has been subjected to a simulation of transport from the production site to the optician's.

By way of comparison, FIG. 6 is a photo obtained after the ophthalmic lens marked by means of method B, and therefore not using the method according to the invention, has been subjected to a simulation of transport from the production site to the optician's. The ophthalmic lens 1' is provided for a left eye.

It can thus be seen that the marking present on the ophthalmic lens 1' comprises at least two zones 6 and 7 where the marking is completely erased. In the case of this lens, it is apparent in particular that in zone 6, two of the left alignment lines 5 that make it possible to locate the microcircles are erased and in the zone 7, part of the marking indicating the far vision zone control point 3 is also erased. In particular, the right ")" sign is completely erased and the "+" sign, which could have made it possible to find the center of this zone, is no longer recognizable.

It may furthermore be observed that the ophthalmic lens has a dirty appearance, traces of ink are present in a form resembling dust in the center.

The invention claimed is:

1. A method for printing an inkjet marking on a surface that cannot be wetted by the ink in liquid form, that is to say a surface on which the drop of liquid ink forms a static contact angle greater than or equal to 90°, comprising the following steps:
   (a) forming at least a first drop of solidified ink E1 on the surface, by ejecting, by means of a printhead, a first drop of liquid ink at a first given ejection velocity V1 and with a first given volume VOL1, and
   (b) depositing, on at least one portion of said first drop of solidified ink, at least a second drop of ink E2 having a second volume VOL2, by ejecting, by means of a printhead, a second drop of liquid ink at an ejection velocity V2,
   the first velocity V1 being sufficient to flatten in step a) said first drop of ink on said surface and give said first drop of solidified ink E1 a flattening contact area equivalent to the contact area obtained at equilibrium for a drop of the same liquid ink with the same volume VOL1 present on a wettable surface, which is a surface on which the drop of liquid ink forms a static contact angle of less than or equal to 80°.

2. The printing method as claimed in claim 1, the first ejection velocity V1 of the drop of ink E1 being such that if several drops of ink E1 having a volume VOL1 of 6 pl are deposited at the first ejection velocity V1, the mean diameter of the solidified drops deposited is, seen from above, greater than 39 μm.

3. The printing method as claimed in claim 1, the surface being a surface of non-zero curvature.

4. The printing method as claimed in claim 1, the marking being printed on the surface of an optical article.

5. The printing method as claimed in claim 1, the volume VOL1 of the drop of ink E1 being defined such that the drop of ink E1 is less than the critical volume for which the drop of ink E1 bursts or rebounds when it is deposited at the first velocity V1 on the non-wettable surface.

6. The printing method as claimed in claim 1, the surface that cannot be wetted by the ink in liquid form being such that the drops of liquid ink have a static contact angle with the surface of greater than or equal to 90°.

7. The printing method as claimed in claim 1, the drops of ink E1 and the drops of ink E2 respectively having a first volume VOL1 and a second volume VOL2 such that VOL1/VOL2<1.

8. The printing method as claimed in claim 1, the first volume VOL1 being within the range [5 pl to 15 pl].

9. The printing method as claimed in claim 1, the second volume VOL2 being within the range [20 pl to 50 pl].

10. The printing method as claimed in claim 1, said surface being a hydrophobic surface having a static contact angle with water of greater than or equal to 80°.

11. A method for printing an inkjet marking on a surface that cannot be wetted by said ink in liquid form, comprising a repetition of the steps of the method as claimed in claim 1, thus with the formation of several first drops of ink E1 solidified on the surface and the deposition of several second drops of ink E2 on top of said first drops E1.

12. The method for printing an inkjet marking on a surface that cannot be wetted by said ink in liquid form as claimed in claim 11, several of the solidified first drops of ink E1 being formed on the surface in a first inkjet printing pass and the second drops of ink E2 deposited on top of said first drops of ink E1 being deposited in a second inkjet printing pass, after the first inkjet printing pass.

13. The method of claim 1, wherein the first velocity V1 is sufficient to flatten said first drop of ink and give said first drop of solidified ink a flattening contact area equivalent to the contact area obtained at equilibrium for a drop of the same liquid ink with the same volume VOL1 present on a surface on which the drop of liquid ink forms a static contact angle of less than or equal to 60°.

14. The printing method as claimed in claim 1, the first ejection velocity V1 of the drop of ink E1 being such that if several drops of ink E1 having a volume VOL1 of 6 pl are deposited at the first ejection velocity V1, the mean diameter of the solidified drops deposited is, seen from above, greater than or equal to 40 μm.

15. The printing method as claimed in claim 1, the first ejection velocity V1 of the drop of ink E1 being such that if several drops of ink E1 having a volume VOL1 of 6 pl are deposited at the first ejection velocity V1, the mean diameter of the solidified drops deposited is, seen from above, greater than or equal to 42 μm.

16. The printing method as claimed in claim 1, wherein the marking is printed on the surface of an ophthalmic lens.

17. The printing method as claimed in claim 1, the surface that cannot be wetted by the ink in liquid form being such that the drops of liquid ink have a static contact angle with the surface of greater than or equal to 100°.

* * * * *